(No Model.) 2 Sheets—Sheet 2.
F. D. TUCKER.
SUBSOIL PLOW.
No. 570,192. Patented Oct. 27, 1896.
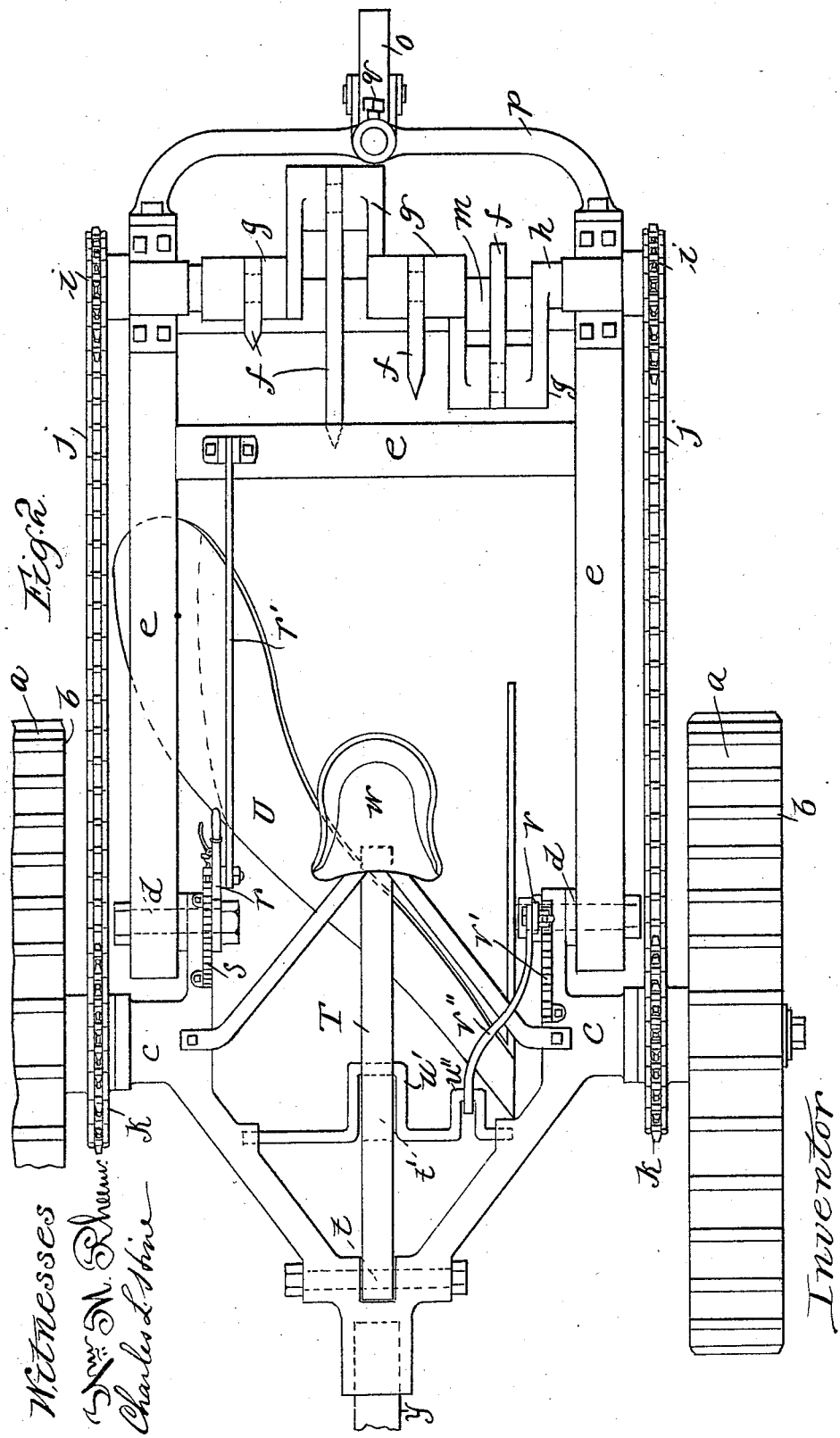
Witnesses
Wm. N. Rhome
Charles L. Shine
Inventor
Frederick D. Tucker
by Albert H. Baker, Atty.

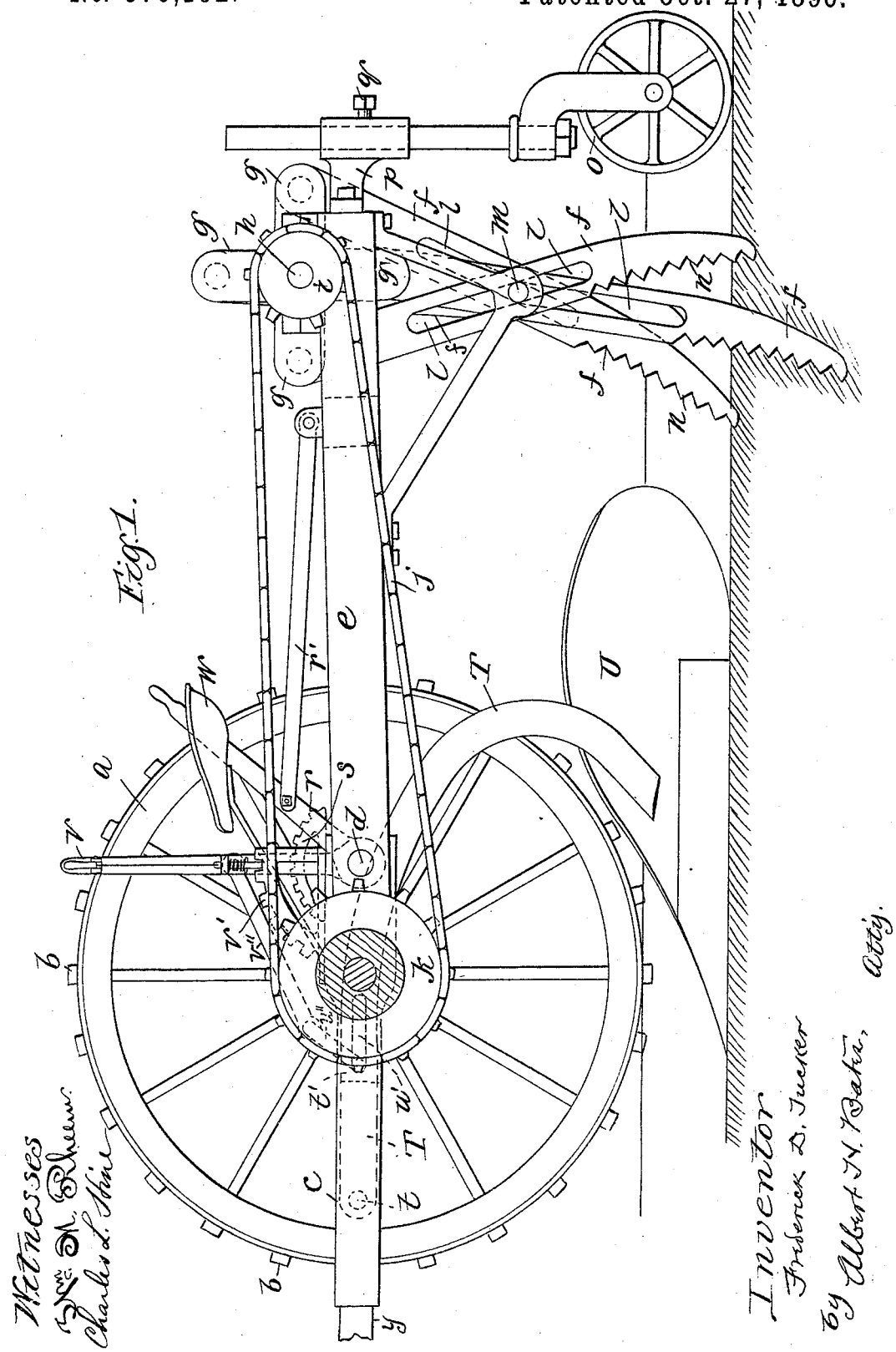

UNITED STATES PATENT OFFICE.

FREDERICK D. TUCKER, OF ST. LOUIS, MISSOURI.

SUBSOIL-PLOW.

SPECIFICATION forming part of Letters Patent No. 570,192, dated October 27, 1896.

Application filed October 18, 1895. Serial No. 566,040. (No model.)

*To all whom it may concern:*

Be it known that I, FREDERICK D. TUCKER, a citizen of the United States, residing in the city of St. Louis, in the State of Missouri, have invented a certain new and useful Improvement in Subsoil-Plows, of which the following is a full, clear, and exact description, reference being had to the accompanying drawings.

The object of my invention is to provide a mechanism adapted to cut and stir up the subsoil without throwing the subsoil upon the upper soil. It may be used by itself either upon the surface of the soil, cutting through both the upper and the subsoil, or along the bottom of a furrow previously cut by a surface-soil plow, or it may be used in conjunction with a plow for the surface soil, the two being embodied in one machine. The object of thus loosening up and cutting the subsoil is to permit water to enter the same for the purpose both of fertilizing it and retaining the moisture for the nourishment of the surface soil in dry seasons. When used in the bottom of the furrow in the upper soil, it effectively destroys the hard bottom left by the surface-soil plow and enables water, which would otherwise evaporate from the furrow or be drained off thereby, to reach the subsoil and be retained there.

My invention consists of one or more knives so supported as to be capable of an up-and-down motion in the subsoil in connection with means for causing this reciprocation as the plow travels over the course.

It consists also in the combinations of parts hereinafter described, and pointed out definitely in the claims.

The drawings show my invention in an appropriate form and in connection with a plow for surface soiling.

Figure 1 is a side elevation of this embodiment of my invention, and Fig. 2 is a plan thereof.

Supported by the wheels $a$, having non-slipping treads $b$, is the axle-frame $c$. Pivoted to this frame at $d$ and $d$ is the frame $e$, which carries at its rear the subsoiling-knives and attachments. Four of these knives (marked $f$) are shown in the drawings, and such I believe to be a convenient number, though more or less than that number may be provided. They consist of long thin bars and are journaled onto double cranks $g$ on the shaft $h$. Sprocket-wheels $i$ on this shaft operate the same, receiving their power through chains from sprocket-wheels $k$, secured to the hubs of the wheels $a$ and $a$. I have shown the shaft $h$ geared with each wheel $a$, thus availing myself of the traction of both wheels, but it may be geared with only one, if desired. Should the plow be driven by a steam or other motor instead of drawn, the shaft $h$ need not be geared with the wheels, but the knives may be given their reciprocation direct from the motor, if desired. These knives have in them slots $l$, by means of which they are held in place by the rod $m$, rigidly suspended from the frame $e$, spools being provided upon the rod $m$ between the knives to prevent their lateral displacement. Thus as the plow is moved forward the wheels rotating transmit a rotation to the shaft $h$, which gives a circular translation to the upper part of the subsoiling-knives and, by reason of the intermediate portions of said knives being guided in a straight line by the rod $m$, causes their lower ends to move up and down and backward and forward. The front edges of these knives are serrated, as shown at $n$, and their rear edges are preferably sharpened. The knives being given a sort of digging motion, as above explained, thoroughly pulverize and loosen up the subsoil in their track and render it of easy access to the water.

Projecting rearward from the frame $e$ is the brace $p$, from which depends a caster-wheel $o$. This wheel is vertically adjustable and, traveling along the bottom of the furrow intended to be subsoiled, regulates the depth of cut of the subsoiling-knives. In the form shown in the drawings the adjustment is controlled by the set-screw $q$, though it might be regulated by a lever or hand-wheel within reach of the driver, or in other suitable manner. A hand-lever $r$, pivoted to the axle-frame $c$ and connected by a link $r'$ with the frame $e$, and having a finger-operated detent engaging with notches in the segment $s$ on the said axle-frame $c$, provides means for elevating the frame $e$ and its attached parts when it is desired to maintain the knives out of operation in the earth. Pivoted to the axle-frame $c$ at $t$ is the beam T of the surface-plow U. This plow is held in position and raised or lowered by the double crank $u'$ working in a slot $t'$ in said plow-beam T and operated by the hand-lever $v$ by means of the link $v''$, connected therewith, and the double crank $u''$. The hand-lever is held in position by a finger-operated detent engaging with notches in the segment $v'$. Suitably supported from the axle-frame $c$ is the driver's seat $w$. The tongue $y$ for the attachment of the horses projects from the front of the axle-frame $c$.

In using the embodiment of my invention shown herein the surface-plow and the subsoiler are first lifted from the ground by an extreme forward movement of the levers $v$ and $r$ and are then held by the detents on the levers. With the parts in this position the apparatus is drawn to its place of operation. The surfacing-plow is then depressed the desired distance by drawing up the lever $v$, and after a few feet of furrow have been turned the subsoiling-knives are depressed into the furrow. The caster-wheel, either now or previously adjusted, rides along the bottom of the furrow and determines the depth of penetration of the subsoiling-knives. It will be noticed that either plow is adjustable independently of the other and that either may be thrown out of operation entirely while the other is working.

Numerous equivalents and modifications will suggest themselves to one skilled in this art, as, for example, the number of subsoiling-knives and their form may be changed, the method of elevating their carrying-frame and of regulating the depth of their cut may be varied, and the means of communicating motion to the knives may be changed. The subsoiling-plow may be used with or without the surface-plow, and if a surface-plow is used it may be attached in any convenient manner.

The method shown in the drawings of raising and lowering the surfacing-plow I believe to be a convenient one, but it is only illustrative and any convenient method may be used. In general, I do not wish to be understood as limiting myself further than is definitely pointed out in the claims.

Having thus described my invention, what I claim as new, and desire to secure by Letters Patent, is—

1. In a subsoiling-plow, in combination, the frame $e$, the shaft $h$ held on it, the cranks $g$, the knives $f$ carried by said cranks, the bar $m$ projecting through slots in said knives and the adjustable wheel $o$ regulating the depth of cut of said knives, for the purpose specified.

2. In a subsoiling-plow, in combination, the supporting-wheels $a$, the axle-frame $c$, the frame $e$ hinged thereto, the subsoiling-knives $f$ carried by said frame $e$, means for transmitting motion from at least one of said supporting-wheels to said subsoiling-knives, and the wheel $o$ limiting the depth of cut of said knives, for the purpose specified.

FREDERICK D. TUCKER.

Witnesses:
ALBERT H. BATES,
CHARLES L. HINE.